July 26, 1932.  A. W. PHELPS  1,869,114
STOPPING DEVICE FOR AUTOMATIC LATHES AND THE LIKE
Filed April 2, 1930
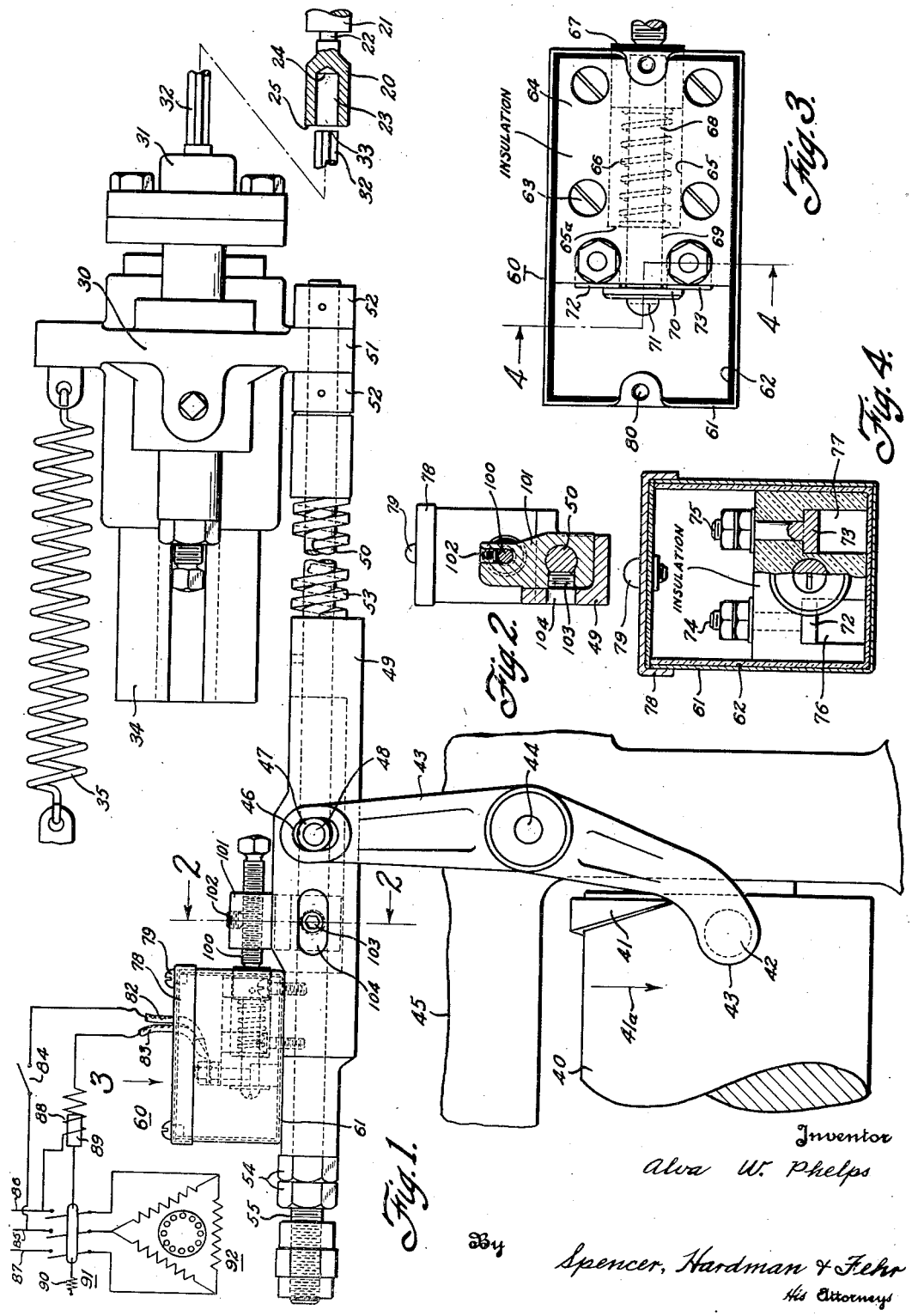
Inventor
Alva W. Phelps
By Spencer, Hardman & Fehr
His Attorneys Patented July 26, 1932

1,869,114

UNITED STATES PATENT OFFICE

ALVA W. PHELPS, OF ANDERSON, INDIANA, ASSIGNOR TO DELCO-REMY CORPORATION, OF ANDERSON, INDIANA, A CORPORATION OF DELAWARE

STOPPING DEVICE FOR AUTOMATIC LATHES AND THE LIKE

Application filed April 2, 1930. Serial No. 441,159.

This invention relates to machines for removing material from work pieces such as lathes, drilling machines and the like and particularly to automatic lathes, generally known as screw machines. One of the objects of the present invention is to provide means for automatically stopping the machine when it begins to produce pieces having dimensions other than those which the machine was adjusted to produce.

In the present embodiment of the invention this object appears accomplished by providing a c ntactor for engaging that part of the work piece which is required to be accurately dimensioned, a machine control switch actuator having a rigid connection with the contactor, and a mechanism operated by the machine and having a yielding connection with the contactor and carrying the machine control switch. If the work piece is properly dimensioned, the contactor will be permitted to move against the work piece, the full predetermined distance corresponding to that for which the contactor operating mechanism had been adjusted, hence, the yielding connection between the contactor and the contactor operating mechanism will not be caused to yield and there will be no relative motion between the machine control switch rigidly connected with the contactor and the switch actuator yieldingly connected with the contactor. If, due to dulling of the tools, insufficient material has been machined away from the work piece, to produce a work piece of proper dimensions, the contactor will not be permitted to move the full predetermined distance through which it is capable of being moved by its operating mechanism. Hence, the connection referred to will yield sufficiently to effect such relative movement between the motor control switch and its actuator as to effect the stopping of the motor which operates the machine.

Further objects and advantages of the present invention will be apparent from the following description, reference being had to the accompanying drawing wherein a preferred embodiment of one form of the present invention is clearly shown.

In the drawing:

Fig. 1 is a fragmentary view partly diagrammatic showing an embodiment of the present invention.

Fig. 2 is a sectional view on line 2—2 of Fig. 1.

Fig. 3 is a plan view of the motor control switch with the cover of the switch case removed and is a view looking in the direction of the arrow 3 in Fig. 1.

Fig. 4 is a sectional view on line 4—4 of Fig. 3.

Figs. 2, 3 and 4 are drawn to a larger scale than Fig. 1.

In Fig. 1, 20 designates the work piece which has been machined in an automatic lathe from a bar of stock 21, but remains connected therewith by a neck 22 to be cut off in a subsequent operation. The part 20 has been operated up by a drill to provide a hole 23, the bottom wall 24 of which is required to be a predetermined distance from the end wall 25. In order to permit the automatic lathe to operate only so long as the hole 23 has been drilled to the proper depth as measured from the end surface 25, one of the movable tool rests 30 of the automatic machine is provided with a tool holder 31 carrying a contactor 32, which may also be a cutting tool such as a reamer, the end 33 of which will engage the bottom or end wall 24 of the hole 23. Obviously, the reamer operates to finish to a true cylindrical surface the wall of the hole 23 which was formed by a drilling operation. The tool rest or slide 30 is supported and guided for movement longitudinally of the work by a guide block 34 provided by the automatic machine. The tool slide 30 is maintained normally retracted from the work by a spring 35.

The tool slide 30 is actuated toward the work by a mechanism associated with the automatic lathe. This mechanism comprises a drum 40 carrying a cam plate 41 adapted to engage a roller 42 on the lower end of a lever 43 pivoted at 44 upon the machine frame 45 and provided at its upper end with a slot 46 engaging a roller 47 mounted on a stud 48 attached to a frame 49 slidable along a rod 50 passing through an apertured ear 51 of the tool slide 30 and having collars 52 fixed thereto on either side of the ear 51. A spring 53 surrounding the rod 50 provides a yielding connection between the frame 49 and the tool slide 30. The spring 53 is normally compressed and relative movement of the frame 49 toward the left is limited by nuts 54 adjustably fixed upon the threaded end 55 of the rod 50.

When the turret of the automatic machine has been indexed so that the work piece 20 is located in alignment with the contactor or reamer 32, the cam 41 moving in the direction of the arrow 41a, will operate upon the roller 42 so as to cause the lever 43 to move clockwise and the frame 49 to move toward the right. Motion is transmitted by the spring 53 of the frame 49 to the tool slide 30. If the contactor 32 is also a cutting tool such as a reamer, the spring 53 is made sufficiently stiff to transmit without appreciably compressing the spring 53 beyond its normal state of compression, sufficient force to the tool slide 30 to cause the reamer 32 to ream the cylindrical side wall of the hole 23. If the hole 23 had been drilled to the proper depth, the reamer 32 would be permitted to enter the piece 20 a distance corresponding to that for which the tool slide operating mechanism had been designed or adjusted, hence, there would be no substantial relative movement between the frame 49 and rod 50.

If, due to the dulling of the drill which had been used to drill the hole 23, said hole had not been drilled a sufficient depth, movement of the tool slide 30 toward the right would be abnormally resisted before the frame 49 had completed its movement toward the right. Hence, the frame 49 will move a substantial amount toward the right relative to the rod 50. This relative movement is taken advantage of by causing the automatic lathe to stop when it begins to produce pieces of improper dimensions. In order to accomplish this the frame 49 carries a switch 60 and the rod 50 carries a switch actuator 100.

The switch 60 comprises a case 61 lined with insulation 62 and attached by screws 63 to the frame 49. The screws 63 also secure within the case 61 a nonconducting block 64 providing a recess 65 for a spring 66 and a guide for a nonconducting switch operating button or head 67 attached to a rod 68 which the spring 66 surrounds. The rod 68 passes through a hole 69 in the block 64 and its left hand end carries a switch contact 70 attached to the rod 68 by screw 71. The spring 66 being located between the head 67 and the shoulder 65a of the block 64, urges the rod 68 toward the right and the contact 70 into engagement with contacts 72 and 73 provided respectively, by the heads of screws 74 and 75, these heads being somewhat rectangular in shape and being received by recesses 76 and 77 respectively, in the block 64, these recesses preventing turning of the screws. The switch case 61 receives a cover 78 attached by screws 79 threaded into apertured ears 80 of the case 61. The cover 78 provides a hole through which wires 82 and 83 may pass, these wires being connected with terminal screws 74 and 75 respectively. Wire 82 is connected by a manually operated switch 84 with a line wire 85, line wire 86 is connected by magnet winding 88 with wire 83. Normally, the switch 60 is closed. When the manual switch 84 is closed the magnet winding 88 will be energized to attract an armature 89 toward the right against the action of the spring 90 which normally maintains open the main switch 91 which connects the line wires 85, 86 and 87 with an electric motor 92. The automatic lathe will continue to be operated by the motor 92 so long as switches 84 and 60 remain closed.

The actuator 100 of the automatic control switch 60 is in the form of a screw threaded through a bracket 101 and fixed in the adjusted position by set screw 102. The bracket 101 is adjustable along the rod 50 and is secured in position by a set screw 103 which is accessible through a slot 104 in the side wall of the frame 49. If the depth of the hole 23 in the piece 20 is less than the required dimension, relative movement of the switch 60 toward the right relative to the actuator 100 will take place, thereby causing the switch contact 70 to be moved toward the left relative to the contacts 72 and 73. When the circuit of the holding coil magnet 88 is interrupted, the main motor switch 91 will be opened by the spring 90 and the motor 92 will stop. The stopping of the automatic lathe will notify its attendant that the work pieces produced are not being made according to predetermined dimensions. Therefore, the necessary replacement of tools and adjustments of the machine can be made before the machine is started into operation again.

Therefore, it is apparent from the foregoing description of the construction and mode of operation of the present invention that said invention automatically eliminates considerable waste and hence a saving of time and material for the reason that the machine is stopped as soon as it begins to produce improperly dimensioned parts. Heretofore, it has been the practice to inspect the parts after a considerable quantity had been produced by the automatic lathe. If those parts were not properly dimensioned they were scrapped and then the machine was adjusted. Under the old practice there would be not only a loss of material but also a loss due to the fact that the machine had operated unnecessarily while producing improperly dimensioned parts. These disadvantages have all been eliminated since the machine is stopped before it has had a chance to manufacture a substantial quantity of parts which would be rejected upon inspection.

While the disclosed embodiment of the invention provides for automatically inspecting the depth of a hole, it is apparent that the invention can readily be applied to the inspecting of the dimensions of other surfaces or configurations of the parts produced. In fact, it will be readily apparent to those skilled in the art that if it were desired to inspect all surfaces of the work part 20 shown in Fig. 1, all the tool slides of the automatic machine could be provided with actuating mechanisms such as shown in the drawing, and each of these mechanisms could have associated with it a motor control switch and switch actuator. Obviously, all of these switches would be connected in series so that if any one of them were opened, the machine would stop.

While the form of embodiment of the present invention as herein disclosed, constitutes a preferred form, it is to be understood that other forms might be adopted, all coming within the scope of the claims which follow.

What is claimed is as follows:

1. Apparatus for stopping a machine which removes material from a work piece, comprising: power means for operating the machine, a contactor for engaging the work, means for transmitting motion to the contactor to move the same against the work and including two members mounted for movement one relative to the other as well as movement together, and including means for yieldingly transmitting motion from one member to the other, a controller for the power means mounted on one of said members, and a controller actuator mounted on the other member.

2. Apparatus for stopping a machine which removes material from a work piece, comprising: an electric motor for operating the machine, a contactor for engaging the work, means for transmitting motion to the contactor to move the same against the work and including two members mounted for movement one relative to the other as well as movement together, and including means for yieldingly transmitting motion from one member to the other, a switch for controlling the motor, mounted on one of the members and a switch actuator mounted on the other member.

3. Apparatus for stopping a machine which removes material from a work piece, comprising: an electric motor for operating the machine, a contactor for engaging the work, means for operating the contactor to cause the same to engage the work and comprising a machine operated cam, a frame moved by the cam, a rod slidably supporting the frame and connected with the contactor, a spring transmitting motion from the frame to the contactor, a switch for controlling the motor mounted on the frame, and a switch actuator mounted on said rod.

4. Apparatus for stopping a machine which removes material from a work piece, comprising: power means for operating the machine; a controller device for controlling the power means; a controller actuating device for operating the controller; a contactor for engaging the work piece; means rigidly connecting the contactor with one of said devices; means yieldingly connecting the contactor with the other of said devices; and means operating through said yielding connection for moving the contactor against the work.

5. Apparatus for stopping a machine which removes material from a work piece, comprising: an electric motor for operating the machine; an electric switch device for controlling the motor; a switch actuator device, a contactor for engaging the work piece; means rigidly connecting the contactor with one of said devices; means yieldingly connecting the contactor with the other of said devices; and means operating through said yielding connection for moving the contactor against the work.

6. Apparatus for stopping a machine which removes material from a work piece, comprising: an electric motor for operating the machine; an electric switch device for controlling the motor; a switch actuator device, a contactor for engaging the work piece; a member rigidly connecting the contactor with the switch actuating device; a second member supporting the switch device adjacent the actuator device; means operated by the machine for moving the second member; and a spring for transmitting motion from the second member to the contactor.

In testimony whereof I hereto affix my signature.

ALVA W. PHELPS.